E. B. LUDWIG.
DEVICE FOR APPLYING ANTISLIPPING CHAINS TO PNEUMATIC TIRES.
APPLICATION FILED MAY 26, 1916.
1,266,507.
Patented May 14, 1918.
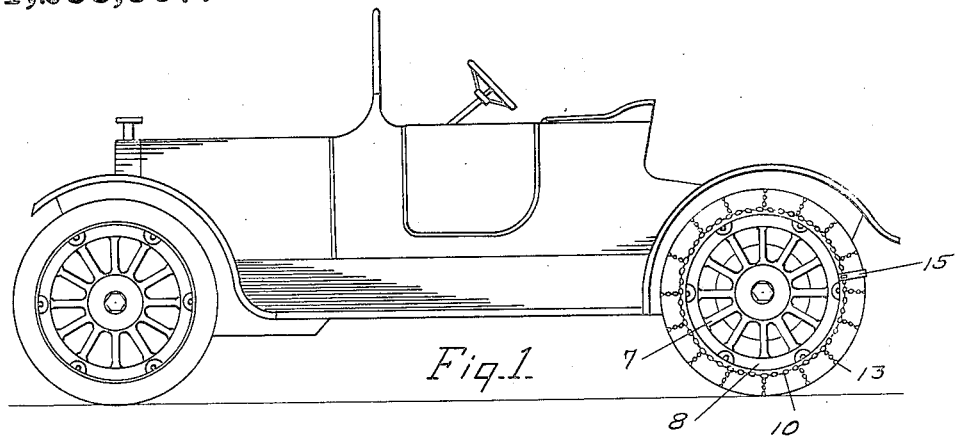
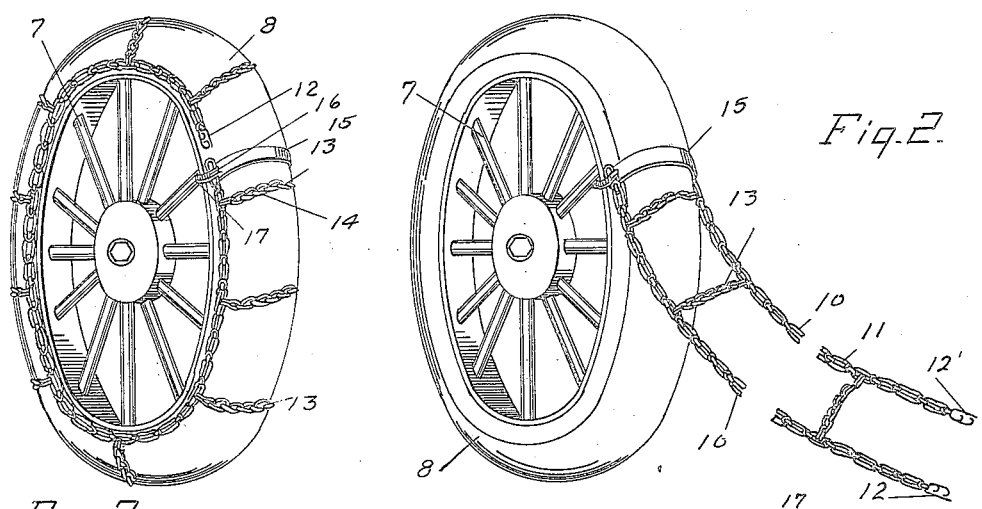
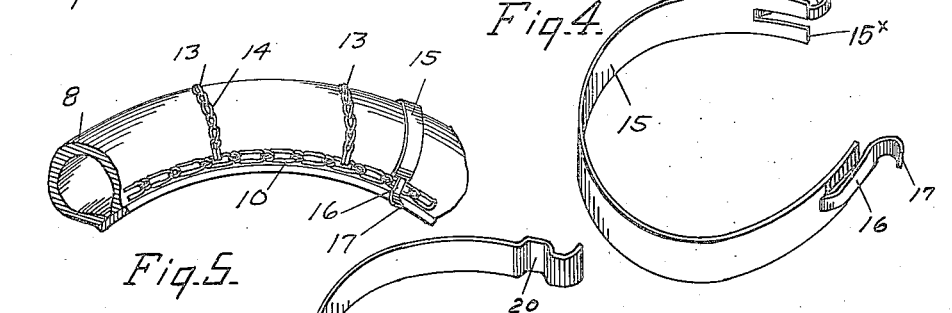
WITNESSES:
INVENTOR
Edmund B. Ludwig
BY Richer Manning
ATTORNEY

UNITED STATES PATENT OFFICE.

EDMUND B. LUDWIG, OF KANSAS CITY, MISSOURI.

DEVICE FOR APPLYING ANTISLIPPING-CHAINS TO PNEUMATIC TIRES.

1,266,507.   Specification of Letters Patent.   Patented May 14, 1918.

Application filed May 26, 1916. Serial No. 100,126.

*To all whom it may concern:*

Be it known that I, EDMUND B. LUDWIG, a citizen of the United States of America, residing at Kansas City, in the county of Jackson and State of Missouri, have invented a certain new and Improved Device for Applying Antislipping-Chains to Pneumatic Tires, of which the following is a specification.

The common method of applying the non-slipping chain to the pneumatic tire is to extend the chains on the ground, in rear of the driving wheels and under the power of the motor the vehicle is moved rearwardly until the wheels pass to a position upon the chains intermediate their ends. The ends of the chains are then raised upon the surface of the tire and brought together and fastened by hooks upon said ends.

My invention consists in the novel device for attaching the end of the chain to the pneumatic tire hereinafter more fully described and specifically pointed out in the claim, reference being had to the accompanying drawings forming a part of this specification.

In the drawings:

Figure 1. is a side view of an automobile, showing the non-slipping chain applied to the pneumatic tire of the rear wheel.

Fig. 2. is a view, in perspective, of a wheel and its pneumatic tire, as seen in Fig. 1, showing the non-slipping chain extended in length toward the ground, in the rear of the wheel, and its forward end portions connected by the novel device to the tire.

Fig. 3. is a like view of the wheel, in position following a single revolution of the wheel, and showing the non-slipping chain thereon, and its ends in readiness to be fastened together.

Fig. 4. is a perspective view of the spring plate.

Fig. 5. is an enlarged, detail view of a portion of the pneumatic tire, reverse to that seen in Fig. 2, showing the end of the chain attached to the tire, as in Fig. 2, and the spring plate.

Fig. 6. is a view of a modified form of the spring plate.

Similar numerals of reference indicate corresponding parts in all the figures of the drawing.

7 in the drawings indicates the rear wheels of the motor vehicle, and 8 the pneumatic tire. 9 indicates the non-slipping chain of which 10, 10 are the parallel side chains composed of the links 11.

12, 12' indicate hooks, connected with the links 11, at the rear ends of the chains 10. 13 indicates the cross chains, composed of the links 14, which are connected with the links 11, upon the respective chains 10, 10, and arranged at proper distances apart.

15 indicates the bowed spring plate for securing the chains to the tire of the wheel, and 16 the outwardly-bent spring clips for securing the links at the end of the chains, which are narrow in width and extend in length past the line of the end portions $15^{x}$ of said plate a considerable distance to form lever extensions, the end portions of which clips are curved outwardly at 17 and which are grasped by the hand in attaching the spring plate to the tire.

In operation the links 11, of the chains 10, 10, adjacent the ends of the chains are inserted within the spring clips 16, 16, on the bowed spring plate 15, the links being thereby held from movement.

The rear end portions of the chains 10, 10 are then spread apart and extended rearwardly from and in line with the wheel 7. A forward motion is then imparted to the vehicle, causing the wheel 7 to make one rotary movement, the chains 10, 10 following the outer surfaces of the tire, and the cross chains in succession resting upon the outer surface of the tire.

Upon the completion of this movement, both ends of the chains 10, 10 are adjacent each other, as seen in Fig. 3.

The links 11, at the ends of chains 10, 10, are then connected with the hooks 12, 12', on the respective chains, and the spring plate 15 removed from the tire.

The means of attachment of the non-slipping chain to the spring plate may be varied, as, for instance, in Fig. 6, which shows the clip portions of the spring plate stamped out, as at 20, so as to receive the link 11, of the chains, on the inner side of the spring plate, in which position the links are clamped against the outer surfaces of the pneumatic tire, when the spring plate is secured to the tire.

Having fully described my invention, what I now claim as new and desire to secure by Letters Patent is:

A device for applying anti-skid chains to a wheel for motor vehicles, comprising a bowed spring plate, having inwardly curved projections of the spring plate adjacent the ends of said plate, clips supporting the ends of the chain and lever extensions, extending from said clips beyond the ends of said bowed spring plate, for attaching and removing the spring plates from the wheel.

EDMUND B. LUDWIG.

Witnesses:
ROBERT O. MCLIN,
ANNIE L. GREER.